United States Patent [19]
Adams

[11] Patent Number: 5,779,345
[45] Date of Patent: Jul. 14, 1998

[54] LIGHTED HOOD ORNAMENT

[76] Inventor: Elroy Adams, P.O. Box 5069, West Memphis, Ark. 72303

[21] Appl. No.: 779,989

[22] Filed: Dec. 23, 1996

[51] Int. Cl.[6] ............................................. B60Q 1/02
[52] U.S. Cl. .................................... 362/80; 362/833
[58] Field of Search .................... 362/61, 80, 83, 362/83.3, 234

[56] References Cited

U.S. PATENT DOCUMENTS

| | | | |
|---|---|---|---|
| 1,771,300 | 7/1930 | Keeman | 362/80 |
| 2,153,104 | 4/1939 | Sweitzer | |
| 2,196,915 | 4/1940 | Ginzalez | |
| 2,831,176 | 4/1958 | Liberto | 362/80 |
| 3,175,186 | 3/1965 | Barenyi | 362/80 |
| 3,321,618 | 5/1967 | Goldbaum et al. | 362/83.3 |
| 5,072,340 | 12/1991 | Jones | 362/80 |

Primary Examiner—Y. My Quach
Attorney, Agent, or Firm—Jansson, Shupe, Bridge & Munger, Ltd.

[57] ABSTRACT

The disclosure involves a lighted hood ornament for a vehicle which provides light in an upwardly direction, thereby enhancing safety, particularly in low lighting conditions. The device provides a broader range of vision for the driver of the vehicle to which the device is affixed by increasing visibility in front of, beside and above the area illuminated by the vehicle's headlights. The device also makes the vehicle more visible to others, particularly to drivers of trucks and vans. It can also be beneficially used as a locating device for a vehicle in a crowded parking lot or in the emergency lane of a highway. In addition to enhancing driving safety, the device further enhances the personal safety of the driver by increasing the driver's range of vision and his ability to see objects and people outside of the vehicle at night or at other times of low visibility.

12 Claims, 5 Drawing Sheets

LIGHTED HOOD ORNAMENT

FIELD OF THE INVENTION

This invention relates generally to vehicular lights and, more particularly, to exterior safety lights for automobiles.

BACKGROUND OF THE INVENTION

Vehicular lights of the prior art are generally designed to light up the road surface, the interior of the automobile or to provide warning signals to other vehicles.

The known vehicular lighting devices of the prior art have certain disadvantages and limitations from a safety standpoint. For example, although those devices of the prior art, such as headlights, enhance the driver's range of vision, they tend to direct light toward the road surface and accomplish little toward illuminating the visual field at, or above, the eye-level of the driver of the vehicle.

Another disadvantage of the devices of the prior art is that the safety lights of the prior art, such as parking lights, emergency lights or blinkers, which are designed to enhance visibility of the vehicle to other drivers and to provide warning to other drivers, are generally positioned at or about the same level as automobile headlights, thereby illuminating only that portion of the vehicle close to the road surface.

There are situations when the vehicular lighting of the prior art does not sufficiently meet a driver's needs. When visibility conditions are poor due to low light levels, such as at night or during inclement weather, lighting in addition to that typically provided by the prior art may be particularly desirable and useful for safety purposes. Enhanced illumination of the area directly in front of, beside and above, the driver in such circumstances, rather than merely of the road surface, would greatly enlarge the driver's range of vision.

Another safety concern not addressed by the prior art is the difficulty that many truck or van drivers have in clearly seeing automobiles, particularly those traveling in the same direction, in conditions of poor visibility. Automobile lights directed toward the road surface are much less visible to the drivers of trucks and vans because such drivers sit higher off of the road surface than drivers of automobiles and therefore have a higher field of vision.

Furthermore, rear view mirrors on trucks and vans are positioned much higher off the road surface, making it more difficult for the drivers of such vehicles to see the headlights of an automobile upon passing or changing lanes.

Enhanced visibility of low-lying automobiles to the drivers of trucks or vans is particularly needed. It is difficult, especially in poor lighting conditions, for drivers of trucks and vans to clearly see the headlights and other traditional vehicular lights of automobiles traveling next to or behind such trucks or vans, thereby causing significant safety concerns.

The vehicular lights of the prior art also do not address other safety and practical concerns. For example, additional lighting in the front of an automobile, and projected in an upwardly direction, could be extremely helpful at night when attempting to parallel park the vehicle. Such lighting, by illuminating the rear end of the automobile located in the parking space ahead of the driver, would make it easier to calculate distances between the vehicles.

Furthermore, by illuminating the upper portion of a parked vehicle located ahead of the driver, the driver would be able to clearly see any unexpected projections, protruding from a station wagon or trunk, that could cause damage to his vehicle.

There also is a need to increase visibility outside and above a vehicle at night to better enable the driver of the vehicle to see and read street signs.

Furthermore, additional lighting could be very advantageous to a driver if it is necessary or desirable to examine anything outside of the vehicle at night while the vehicle is parked.

Additionally, lighting extending above and to the side of the vehicle would be helpful to prevent the driver from accidentally hitting someone or something that may be in the process of entering the path of the vehicle, such as a person stepping into a dark street or a deer.

Furthermore, the prior art devices do not address increasing concerns for the personal safety of drivers at night, particularly if the vehicle is parked or driven in a high crime neighborhood. There are situations when it would be very advantageous for the driver of a vehicle to be able to see clearly in front of, beside and above the vehicle. This would be particularly true, for example, if the driver is approached by a pedestrian at night while parked or when stopped at a street light. Current vehicular lighting devices would not enable the driver of the vehicle to fully see the upper body portion of a person approaching the vehicle, including any firearm or other object that the pedestrian may be carrying.

Additionally, there is a need for a quick and easy method to locate an automobile in a crowded parking lot. Vehicular lighting devices of the prior art do not enable a driver to find his parked vehicle at night by the use of a lighting device which identifies a vehicle by the use of upwardly directed light beams.

Yet a further need is for a method of making a vehicle easier to see by both highway assistance vehicles and other drivers if a vehicle has broken down or is stopped in the emergency lane of a highway.

OBJECTS OF THE INVENTION

It is an object of the invention to provide additional automobile lighting to increase the driver's range of vision at night or in conditions of poor visibility.

Another object of the invention is to provide a vehicular light that increases the range of visible area in front of, beside and above the road surface to the driver of the vehicle.

A further object of the invention is to enhance the visibility of an automobile to drivers of larger vehicles, such as trucks or vans, that tend to sit higher off of the road surface, by providing light in a more upwardly direction directly in front of and above the automobile.

Yet another object of the invention is to provide additional lighting to the driver of a vehicle without the use of high beams, which can interfere with the vision of drivers in oncoming traffic.

Another object of the invention is to provide a safety device which makes the automobile, whether driven or parked, more visible to other drivers and to highway assistance vehicles.

Still another object of the invention is to provide a device that makes it easier to locate a vehicle having the device in a parking lot.

A further object of the invention is to provide additional lighting when additional lighting on the front of the vehicle is particularly needed, such as when parallel parking the vehicle or when trying to read street signs.

Yet another object of the invention is to provide a safety device that allows the driver of the automobile to see the area clearly in front of, beside and above the vehicle while sitting in the vehicle.

Still another object of the invention is to reduce eye strain caused by driving at night or under conditions of low visibility.

Another object of the invention is to provide additional lighting to assist the driver at night in examining something outside of the vehicle when the vehicle is parked.

A further object of the invention is to provide a safety device that increases the light in front of, beside and above the vehicle, so as to better enable the driver to see anyone or anything that may be in the process of entering the path of the vehicle and thereby avoid injury or damage.

Yet a further object of this invention is to provide increased driver safety from individuals with possible criminal intent who may approach the vehicle at night when the vehicle is parked or stopped at a streetlight.

A further object of this invention is to provide a vehicular lighting device that allows easy access to lamps so that lamps can be changed rapidly and easily without the use of tools.

Another object of this invention is to provide a safety device that is easily installed on any vehicle.

Yet another object of this invention is to provide a safety device that is unique and attractive in appearance.

How these and other objects are accomplished will become more apparent from the following descriptions and from the drawings.

SUMMARY OF THE INVENTION

The invention involves an automotive lighting device affixed to the hood of a self-propelled vehicle. In the improvement, the device has a base, at least one lamp within the base connected to a power source and a lens connected to the base which encloses the lamp therein. The device, when charged by the power source, provides illumination upwardly from the surface of the hood.

In a preferred embodiment, the device has a second base, at least one lamp within the second base connected to the power source and a second lens connected to the second base and enclosing a lamp therein. In this embodiment, the second base is affixed to the hood in close proximity to the base. Preferably, the device is affixed to the hood of the vehicle in such a location as to project light in upwardly angular directions without projecting light directly into the vehicle.

In a preferred embodiment of the invention, the device is battery-powered. The device may have a separate power source. The device may also have a means to turn on and off the power source.

In yet another aspect of the invention, there are two lamps within the base and there are two lamps within the second base. Preferably, the lens and the second lens are translucent. Furthermore, it is preferred that the second base is a mirror image of the base and that the second lens is a mirror image of the lens.

In the preferred embodiment of the device, the size and shape of the lens allow it to fasten securely to the base, upon the application of pressure, without other means of fastening.

In a preferred embodiment of the invention, the device has at least one distance rod connecting the base to the second base, thereby holding the second base in a fixed position relative to the base. In another embodiment of the invention, the base has a base front portion and a base back portion and the second base has a second base front portion and a second base back portion. In this embodiment, a forward distance rod connects the base front portion to the second base front portion and an aft distance rod connects the base back portion to the second base back portion, the forward distance rod and the aft distance rod thereby holding the second base in fixed position relative to the base.

Other aspects of the invention are set forth in the following detailed description and in the drawings.

BRIEF DESCRIPTION OF THE DRAWINGS

FIG. 2 is a side view of a vehicle with the inventive device affixed, showing the approximate range of light the inventive device provides when turned on.

DETAILED DESCRIPTION OF PREFERRED EMBODIMENTS

Figure 1:
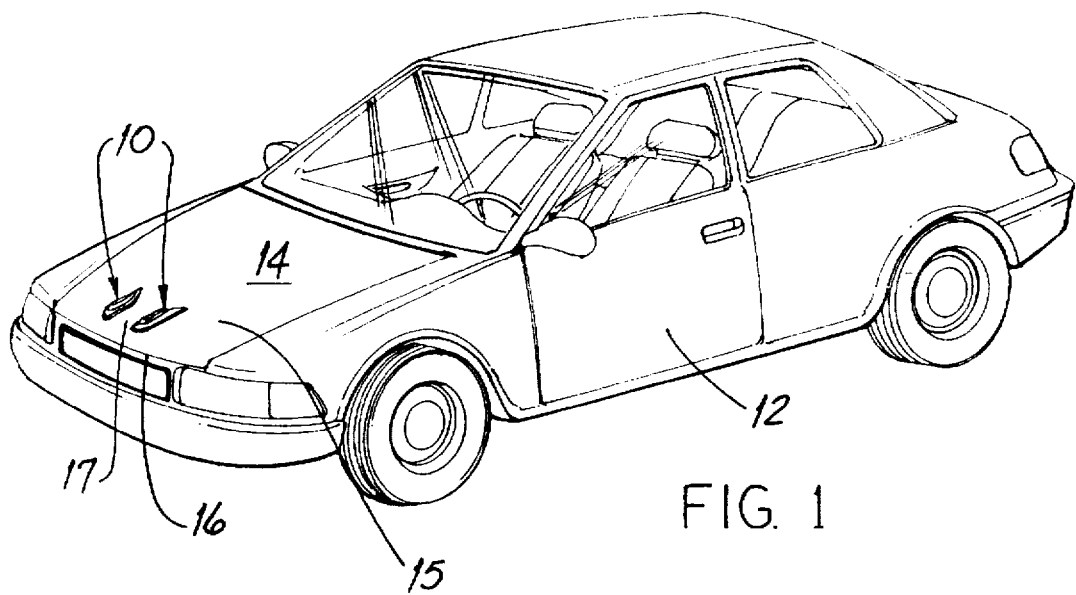
FIG. 1 is a perspective view of a vehicle with the inventive device affixed to the hood thereof.
Figure 2:
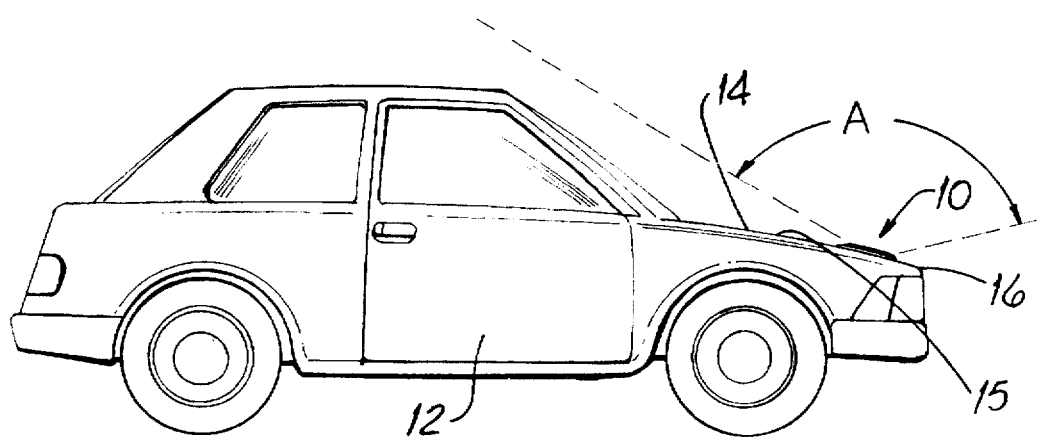

FIGS. 1 and 2 show the new inventive device 10 affixed to a vehicle 12. Ideally, the device 10 is affixed to the hood 14 of the vehicle 12 on the outer surface 15 of the hood, approximately three inches back from the front edge 16 of the hood 14 in the center portion 17 of the hood. On most vehicles, this location tends to provide for the optimal projection of light from the device 10, resulting in good visibility to other drivers and avoiding the direct projection of light into the vehicle 12, which could interfere with, rather than assist, the driver's vision.

Angle A, shown by the broken lines in FIG. 2, illustrates the approximate range of light projected by the device 10 when powered on. However, the device 10 may be placed elsewhere on the hood 14 of the vehicle 12. In fact, due to varying vehicle hood designs and shapes, in some instances, the inclined angle of the hood 14 may make an alternative location more desirable. It should be noted that the device 10, while shown on the hood 14 of an automobile 12, may also be used on vans, trucks or other vehicles.

Figure 3:
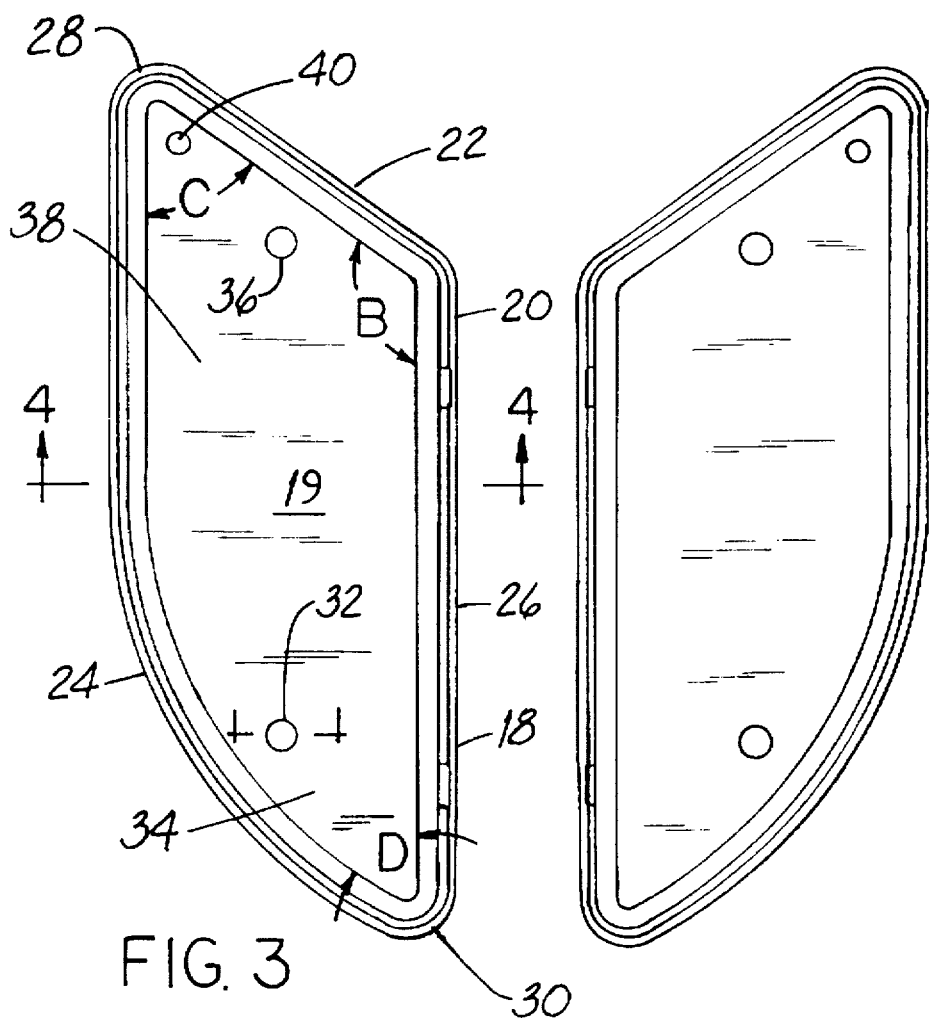
FIG. 3 is a top view of the base and a second base of the inventive device.

FIG. 3 shows a preferred embodiment of the device 10, having a base 18 with a base top surface 19 and a second base 44 which is a mirror image of the base 18. The base consists of three edges, which join together to form the base 18, including: a straight inner edge 20 approximately five and three-quarters inches in length, a straight back edge 22 approximately two and one-half inches in length and a curved outer edge 24 approximately seven and seven-eighths inches in length. The approximate Angle B of intersection of the inner edge 20 and back edge 22 is 125°, Angle C of the intersection of the back edge 22 and outer edge 24 is approximately 55°, and Angle D of the intersection of the outer edge 24 and inner edge 20 is approximately 40°.

The points of joinder of the inner edge 20, back edge 22 and outer edge 24 are rounded on the outside wall 26 of the device 10. The overall length of the preferred embodiment of the device 10 from rear point 28 to forward tip 30 is approximately seven and five-sixteenths inches and the overall width is approximately two inches.

The dimensions of the preferred embodiment provide for a device 10 that is attractive in appearance, is of a size and shape to create the desired angle and power of light and accommodates sufficient bulbs in the base 18. However, other sizes and shapes, as well as number, of base 18 are possible to achieve the desired result. The base 18 may be manufactured from numerous types of materials including metals or polymers. However, due to the exposure to the elements, durability would be an important consideration in choice of materials.

The preferred embodiment includes a base 18 having a front base mounting hole 32 located in the front base portion 34 and a back base mounting hole 36 located in the back base portion 38. The front base mounting hole 32 and the back base mounting hole 36 are optimally each approximately one-eighth of an inch in size. Additionally, the base 18 includes a smaller, base wiring hole 40 near the rear point 28 of the base 18.

Figure 4:
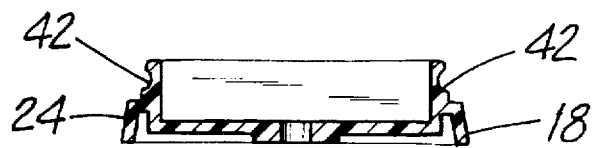
FIG. 4 is a cross-sectional view of the base of the inventive device shown in FIG. 3, taken generally along the viewing plane 4—4.

FIG. 4 shows a cross section of the base 18 taken along plane 4—4 of FIG. 3. The cross section shows indented portions 42 on either side of the outside wall 26 of the base 18.

Figure 5:
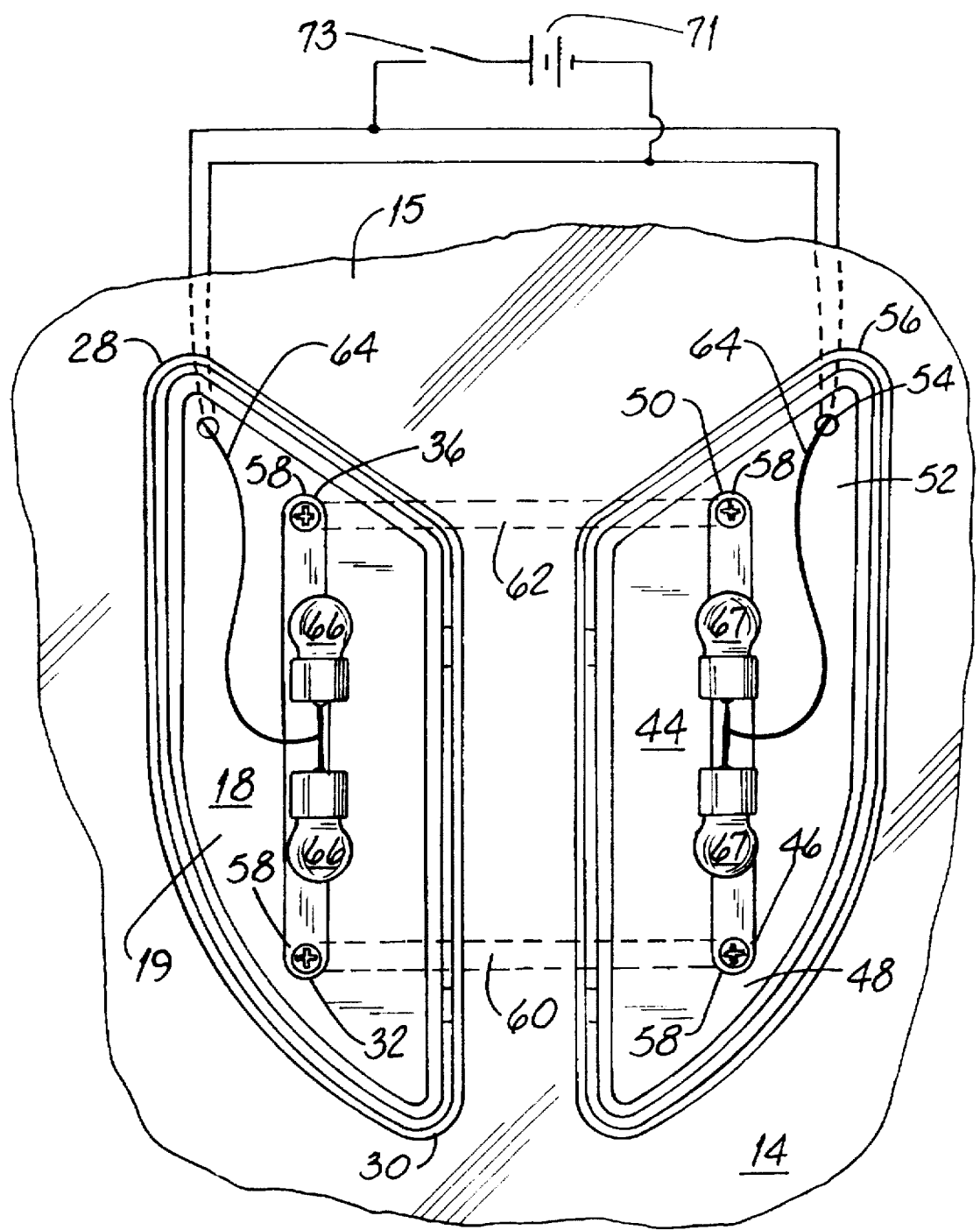
FIG. 5 is a top view of the base and the second base of the inventive device showing approximate placement of wiring and lamps therein with optional distance rods shown in phantom lines beneath the vehicle's hood.

Turning to FIG. 5, the base 18 and the second base 44 of the device 10 are shown as affixed to the hood 14 of a vehicle 12. Second base 44 is affixed to the hood 14 in close proximity and directly to the right of base 18. Second base 44 includes a front second base mounting hole 46 located in the front second base portion 48 and a back second base mounting hole 50 in the back second base portion 52. The front second base mounting hole 46 and the back second base mounting hole 50 are the same size as the front base mounting hole 32 and the back base mounting hole 36. Additionally, the second base 44 includes a second base wiring hole 54 near the second base rear point 56 of the second base 44 of the same size as the base wiring hole 40.

Figure 6:
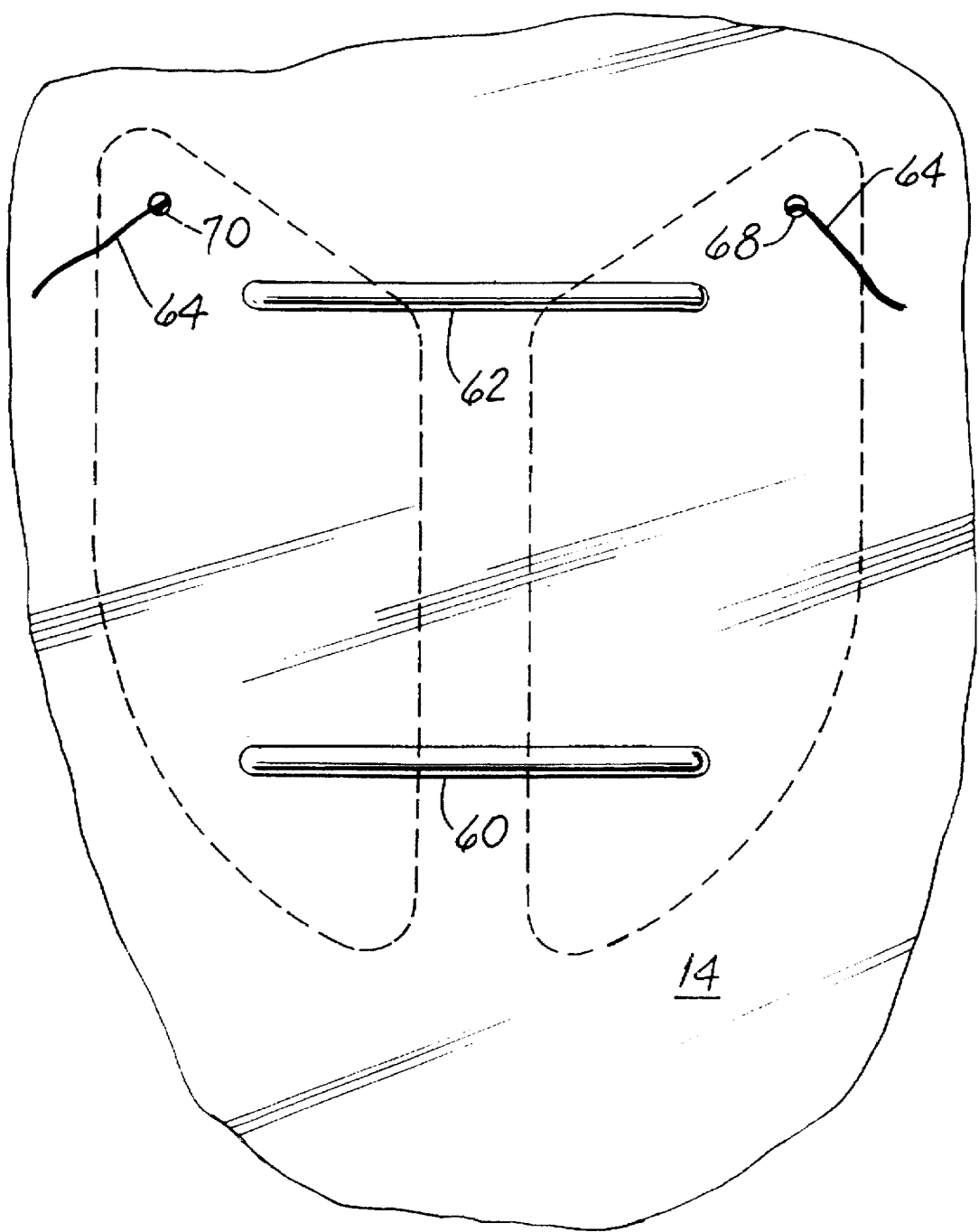
FIG. 6 is a bottom view of the inventive device affixed to the hood of a vehicle showing the distance rods mounted underneath the hood and wiring extending through the hood, with the base and the second base of the inventive device shown in phantom lines.

As shown in FIGS. 5 and 6, the base 18 is mounted to the hood 14 of the vehicle 12 with screws 58 through front base mounting hole 32 and back base mounting hole 36. Similarly, the second base 44 is mounted to the hood 14 of the vehicle 12 with screws 58 through front second base mounting hole 46 and back second base mounting hole 50. The screws 58 are of a sufficient size and shape to hold the base 18 and the second base 44 securely in place on the hood 14 of the vehicle 12.

In one embodiment, as shown in FIGS. 5 and 6, an optional method to assist in the installation of the base 18 and the second base 44 on the hood 14 of the vehicle 12 is shown which incorporates the use of forward distance rod 60 and aft distance rod 62.

The forward distance rod 60 measures five inches long with holes for screws 58 to pass through at either end. As shown in FIGS. 5 and 6, the forward distance rod 60 connects the base 18 to the second base 44 under the hood 14, by screw attachment at one end to front base mounting hole 32 and at the opposite end to the front second base mounting hole 46.

Aft distance rod 62 measures five inches long with holes for screws 58 to pass through at either end. As shown in FIGS. 5 and 6, the aft distance rod 62 connects the base 18 to the second base 44 under the hood 14, by screw attachment at one end to back base mounting hole 36 and at the opposite end to the back second base mounting hole 50. If forward distance rod 60 and aft distance rod 62 are used, screws 58 are secured with nuts or other means after the screws 58 pass through forward distance rod 60 and aft distance rod 62. While the preferred embodiment demonstrates one method for securing the device 10 to the hood 14, the device 10 may be secured in numerous other ways, including, by way of example, by means of wire, solder, glue or other securing means.

In the preferred embodiment, as shown in FIG. 5, two-headed electrical wiring 64 to which lamps 66 are attached for illumination passes from within base 18 through base wiring hole 40 and, likewise, from within second base 44 through second base wiring hole 54. The lamps are affixed to metal strips 45 and the screws 58 secure the metal strips 45 to the base 18 and the second base 44. The screws 58 and metal strips 45 ground the device 10 to the vehicle 12 and are secured by nuts or other means.

As shown in FIGS. 5 and 6, the electrical wiring passes through base wiring hood hole 68 and second base wiring hood hole 70 and connects to a power source such as the vehicle battery, or some other power source 71 connected directly to the device 10.

Although the device 10 could include only one lamp 66, or more than two lamps 66, it has been found that it is preferable to use two lamps 66 each in the base 18 and two second base lamps 67 the second base 44, since this tends to provide the desired amount of overall light and allows the device 10 to function even if one lamp 66 needs replacement. As shown in FIG. 5, the second base lamps 67 and lamps 66 are ideally the same size as small replacement lamps for standard automobile parking lights.

The device 10 may be wired to connect to the parking lights, emergency blinkers or the headlights of the vehicle 10, or may be provided with a separate power source 71 or a switching means 73 so that the device 10 may operate independently from the other vehicle lights.

FIG. 6 shows the device 10 from underneath the hood 14 of the vehicle 12 with the device 10, including forward distance rod 60 and aft distance rod 62 affixed thereto, which are visible beneath the hood 14. As seen from underneath the hood 14, the two-headed electrical wiring 64 extends through base wiring hood hole 68 and second base wiring hood hole 70.

If forward distance rod 60 and aft distance rod 62 are not used, only screws 58 would be visible through front base mounting hole 32, back base mounting hole 36, front second base mounting hole 46 and back second base mounting hole 50.

Figure 7:
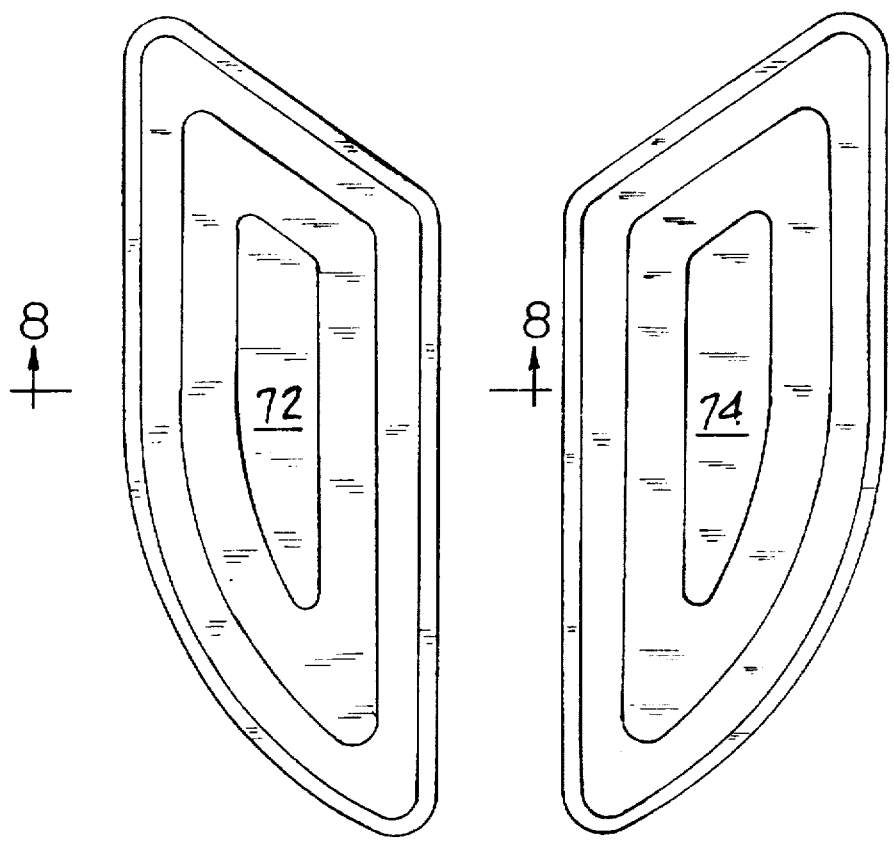
FIG. 7 is a top view of the lens and the second lens of the inventive device.
Figure 8:
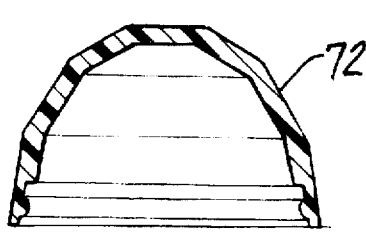
FIG. 8 is a cross-sectional view of the lens of the inventive device shown in FIG. 7, taken generally along the viewing plane 8—8.
Figure 9:
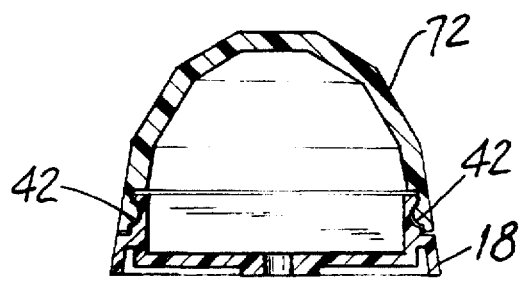
FIG. 9 is a cross-sectional view showing the lens connected to the base.

As shown in FIGS. 7 and 8, the lens 72 of the device 10 projects upwardly approximately one and one-half inches in an elongated semicircular shape and is designed to fit securely on top of base 18. However, the lens may be of varying configurations. A second lens 74, a mirror image of the lens 72, is designed to fit securely on top of second base 44. As shown in FIG. 9, the lens 72 and the second lens 74 are of a size and shape to snap into place on the indented portions 42 of the base 18 and the second base 44, respectively and to remain secure. The ability to snap and unsnap the lens 72 and second lens 74 quickly and without tools makes changing the lamps 66 much easier. The lens 72 and the second lens 74 are ideally translucent to diffuse the light and are preferably amber in color.

Alternatively, the lens 72 may be secured to the base 18 by other means to prevent theft of the lens 72. In this embodiment, the base 18 would include a lip around the outside wall 26 of the base 18 and the lens 72 would include a similar lip which would permit the use of screws or other fastening means between the base 18 and the lens 72 to prevent the easy removal of the lens 72 if it were anticipated that theft might be a problem.

While the principles of the invention have been described in connection with exemplary embodiments, it should be understood clearly that such descriptions are by way of example and are not limiting.

What is claimed is:

1. In a self-propelled vehicle of a type having a hood, which hood has an outer surface, an automotive lighting device affixed to the hood, the device having a base with a longitudinal axis generally parallel to the outer surface of the hood, said base having a base top surface having an opening in a direction perpendicular to the longitudinal axis of the base, at least one lamp situated on the base top surface connected to a power source and a lens connected to the base which lens encloses the base top surface and the lamp thereon, wherein the device, when charged, provides steady illumination upwardly from the outer surface of the hood, thereby providing increased illumination above and in front of the vehicle.

2. The device of claim 1 having a second base, at least one second base lamp within the second base connected to the power source and a second lens connected to the second base which encloses the second base lamp therein, wherein the second base is affixed to the outer surface of the hood in close proximity to the base.

3. The device of claim 2, wherein the device is affixed to the hood in such a location as to project light in upwardly angular directions without projecting light directly into the vehicle.

4. The device of claim 2 wherein the device is battery-powered.

5. The device of claim 4 wherein the device has a separate power source.

6. The device of claim 2 wherein the device has a means to turn on and off the power source.

7. The device of claim 2 wherein there are two lamps within the base and there are two lamps within the second base.

8. The device of claim 2 wherein the lens and the second lens are translucent.

9. The device of claim 2 wherein the second base is a mirror image of the base and the second lens is a mirror image of the lens.

10. The device of claim 2, wherein there is at least one distance rod connecting the base to the second base, thereby holding the second base in a fixed position relative to the base.

11. The device of claim 1, wherein the hood has a center portion and a front edge and further wherein the base is affixed to the outer surface of the hood in close proximity to the front edge of the hood in the center portion thereof.

12. In a self-propelled vehicle of a type having a hood, which hood has an outer surface, an automotive lighting device affixed to the hood, the device having:

a base having a base front portion and a base back portion, at least one lamp within the base connected to a power source, a lens connected to the base which encloses the lamp therein, a second base having a second base front portion and a second base back portion, at least one second base lamp within the second base connected to said power source, a second lens connected to the second base which encloses the second base lamp therein, wherein the second base is affixed to the hood in close proximity to the base, a forward distance rod connects the base front portion to the second base front portion, an aft distance rod connects the base back portion to the second base back portion, the forward distance rod and the aft distance rod thereby holding the second base in a fixed position relative to the base, wherein the device, when charged, provides illumination upwardly from the outer surface of the hood.

* * * * *